United States Patent [19]

Blackwelder

[11] 4,145,921
[45] Mar. 27, 1979

[54] VORTICITY PROBE UTILIZING STRAIN MEASUREMENTS

[75] Inventor: Ron F. Blackwelder, Torrance, Calif.

[73] Assignee: University of Southern California, Los Angeles, Calif.

[21] Appl. No.: 871,902

[22] Filed: Jan. 24, 1978

[51] Int. Cl.$^2$ .............................................. G01P 5/08
[52] U.S. Cl. ................................. 73/170 A; 73/194 E
[58] Field of Search ............ 73/170 A, 194 B, 194 C, 73/194 E, 194 M, 228, 505, 189

[56] References Cited

U.S. PATENT DOCUMENTS

| | | | |
|---|---|---|---|
| 2,714,310 | 8/1955 | Jennings | 73/194 |
| 3,175,395 | 3/1965 | Atanasoff | 73/170 |
| 3,203,237 | 4/1965 | Ogren | 73/194 |
| 3,213,682 | 10/1965 | Gongwer | 73/194 |
| 3,240,060 | 3/1966 | Doyle | 73/194 |
| 3,381,529 | 5/1966 | Martin et al. | 73/228 |

OTHER PUBLICATIONS

Instrument & Apparatus News, 1/54.
Tollins et al., "Torsion Vane Flowmeter for the Continuous Recording of Air Flow", in J. of Sci. Instruments, 1962, vol. 39, pp. 115-118.

*Primary Examiner*—Herbert Goldstein
*Attorney, Agent, or Firm*—Nilsson, Robbins, Dalgarn, Berliner, Carson & Wurst

[57] ABSTRACT

A probe with no-moving parts for measuring the vorticity of a flowing fluid. The probe consists of an elongated, cylindrical stem member having one end fixedly mounted, means for imparting to the other end of the stem member a torque which is proportional to the vorticity of a flowing fluid, and means for measuring the imparted torque. In a specific embodiment the torque imparting means consists of fins attached to the other end of the stem member and the measuring means consists of strain gauges oppositely wound around the circumference of the stem member. The strain gauge outputs indicate the torque being applied to the stem, and therefore provide signals proportional to the vorticity of the flowing fluid.

12 Claims, 5 Drawing Figures

VORTICITY PROBE UTILIZING STRAIN MEASUREMENTS

FIELD OF THE INVENTION

This invention relates to fluid flow measurement devices, and more specifically to devices for measuring vorticity of a flowing fluid.

BACKGROUND AND SUMMARY OF THE INVENTION

The vorticity in any gas or liquid having a relative motion is one of the more fundamental properties of that motion. It is a well defined quantity in fluid mechanics and is related to the angular velocity of the fluid at every point, and hence ranks in importance to the velocity itself. Since vorticity is always present whenever there is relative motion between a fluid and a solid surface, it determines how much energy must be expended in order to maintain the relative motion. In spite of its importance, few vorticity measurements have been made because many conventional types of vorticity probes are either fragile or cumbersome. One type of vorticity probe, commonly known as a Kovansznay vorticity meter, utilizes precisely heated wires of approximately 0.0001 inches in diameter. The wires are oriented in a predetermined geometrical configuration and measure changes in the velocities of the flowing fluid by sensing temperature changes within the wires. This type of probe is extremely complicated and fragile. A second type of vorticity meter, called a vane-type probe, is provided with vanes which rotate at an angular rate proportional to the angular velocity of the flowing fluid. Because of its large size and problems associated with friction and complicated output instrumentation, its use has been confined primarily to applications requiring only visual indications of vorticity.

The vorticity measurement probe of the present invention eliminates the above-described problems. It is rugged, of small size and provides an output not requiring complicated output instrumentation or analysis techniques. The probe comprises an elongated stem member having one end fixedly mounted to a holding structure that orients the longitudinal axis of the stem member at a predetermined angle with respect to the desired flow of fluid to be measured. In one embodiment, the stem member is formed with a rotation-preventing indentation at one end which is slidably received by the holding structure. The other end of the stem member incorporates means for imparting a torque to the stem member proportional to the vorticity of the flowing fluid. The torque imparting means can be defined by any surface configuration sufficient to impart the desired torque as exemplified by fixedly mounted fins or by a sphere having a roughened outer surface. Finally, the invention comprises means for measuring the torque developed by the torque imparting means. In one embodiment the measurement means consists of two longitudinally extending strain gauges spirally wound on the stem member so that their principal axes are at 45 degrees with respect to the longitudinal axis and are aligned with the principal axis of the stem member. The strain gauges are oppositely wound with respect to each other thereby forming a 90 degree angle at their intersection.

Another embodiment of the measurement means consists of four additional longitudinally extending strain gauges mounted at 90 degree intervals around the circumference of the stem member. These gauges are used to determine the component of the fluid velocity flow which is normal to that portion of the flow parallel to the longitudinal axis of the stem member. They can be used in conjunction with the spirally wound strain gauges described above.

The vorticity measurement device of the present invention does not require any moving parts. By appropriately choosing the stem material and utilizing strain gauges, or any of several other torque measuring devices, a signal proportional to vorticity can be obtained for a wide range of vorticity conditions. The lack of moving parts and the need for only elementary electronics provides a simple, rugged and highly reliable device heretofore unavailable in the art.

DETAILED DESCRIPTION

As required, detailed illustrative embodiments of the invention are disclosed herein. These embodiments exemplify the invention and are currently considered to be the best embodiments for such purposes. However, it is to be recognized that other strain gauge configurations and torque imparting means can be utilized to implement the principles of the invention. Accordingly, the specific devices disclosed are representative in providing a basis for the claims which define the scope of the present invention.

As above indicated, the invention provides a vorticity measurement probe having an elongated stem member with one end fixedly mounted to a holding structure, a means for imparting to the other end of the stem member a torque proportional to the vorticity of a flowing fluid, and a means for measuring the thus imparted torque.

Figure 1:
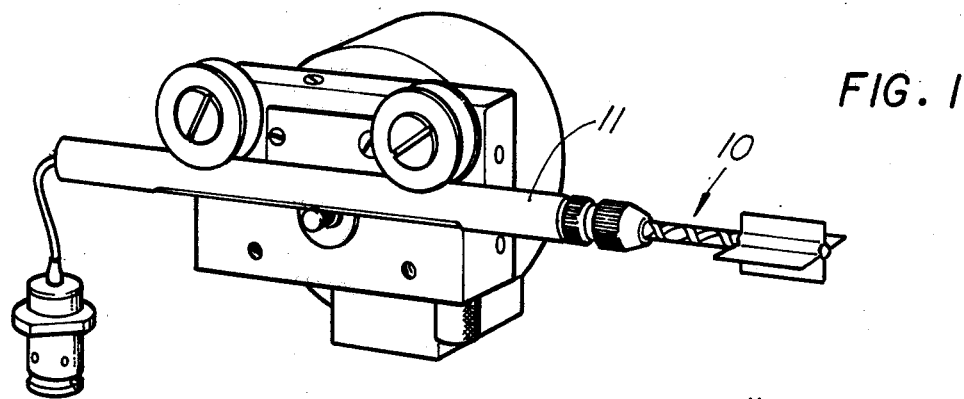
FIG. 1 is a perspective view of a vorticity probe of the present invention fixedly secured to a holding structure.
Figure 2:
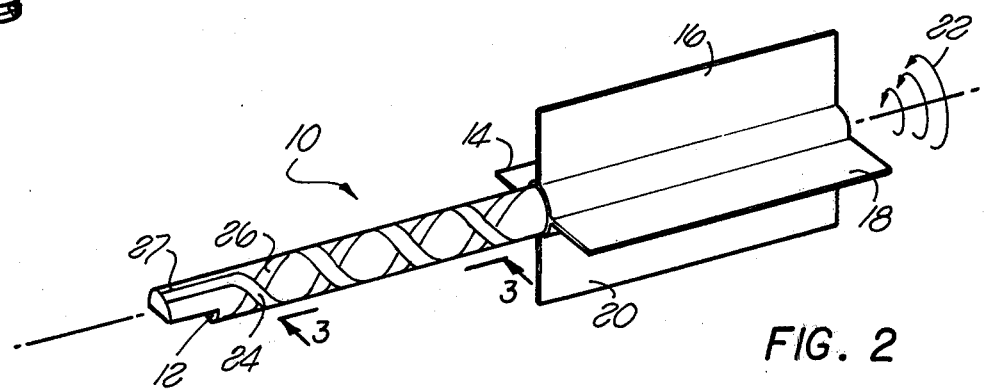
FIG. 2 is an enlargement of the vorticity probe used in FIG. 1.

Referring to FIGS. 1 and 2, a vorticity measurement device or probe comprises a cylindrically shaped, longitudinally extending stem member 10 fixedly mounted to a holding structure 11 which orients the stem member 10 within a flowing fluid. The proximal end of the stem member 10 forms a notched indentation 12 which, when slidably received by the holding structure 11, provides a fixed mounting for the stem member 10. The distal end of the stem member 10 has four fixedly mounted fins 14, 16, 18 and 20 evenly spaced about its circumference; accordingly the distal stem member end is symmetrical around the longitudinal axis of the stem. The fins 14, 16, 18 and 20 side surfaces are substantially parallel to the longitudinal axis of the stem member 10. Vorticity present in a fluid flow as represented at 22 will have a component normal to one surface of each fin 14, 16, 18 or 20. This normal component will impart a force to each fin surface which in turn will impart a torque or twisting movement to the stem member 10. Torque imparted by the fins is measured by a first strain gauge 24 and by a second strain gauge 26 which are spirally-wound and oppositely-wound on the stem member 10. A termination 27 for the first strain gauge 24 is provided on one side of the proximal end of the stem member 10 and a termination (not shown) for the second strain gauge 26 is provided on the other side. Appropriate interfacing conductors are provided within the holding structure 11. In this embodiment, each spiral continues radially for at least 360 degrees, although spirals greater than or less than 360 degrees can be utilized. Alternately, two or more pairs of gauges could be utilized. In a two-pair embodiment, a first pair would be mounted in diametric opposition, each strain gauge forming a plus 45 degree angle with respect to the longitudinal axis of the stem member. The second pair would also be mounted in diametric opposition but each strain gauge would form a minus 45 degree angle with respect to the longitudinal axis of the stem member.

Figure 3:
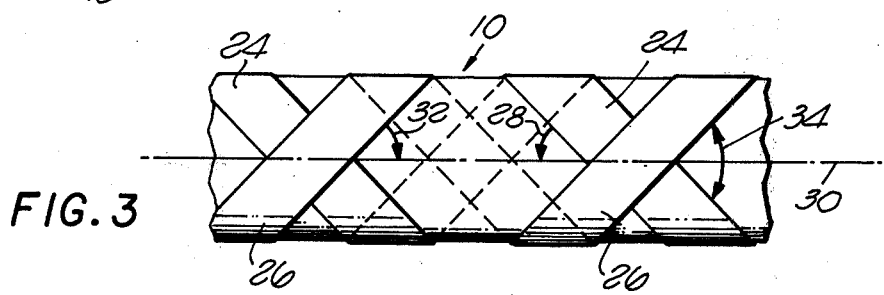
FIG. 3 is an enlarged side view taken along line 3—3 of FIG. 2 showing two strain gauges oppositely wound on the vorticity probe stem.

FIG. 3 shows the strain gauges 24 and 26 on the stem member 10. As can be seen, the first strain gauge 24 is wound so that its longitudinal axis forms a 45 degree angle as shown at 28 with the longitudinal axis of the stem member 10 as represented at 30. Similarly, the second strain gauge 26 is also wound so that its longitudinal axis forms a 45 degree angle with the longitudinal axis of the stem member 10 as shown at 32. However, the two strain gauges 24 and 26 are oppositely wound on the stem member 10 so that their intersection with each other forms a 90 degree angle as shown at 34.

By orienting the two strain gauges 24 and 26 on the stem 10 as above described, each strain gauge output signal is maximized due to the torque induced by the fins 14, 16, 18 and 20. A standard stress analysis of the stem shows that the strain due to the torque will be maximized along the two principal axes of the stem which are oriented at 45 degrees with respect to the main axis 30 of the stem. Such an analysis is provided in *Mechanics* by Higdon, Ohlsen and Stiles, Copyright 1960 by John Wyley and Sons, Inc. on pages 100 through 102, the disclosure of which is hereby incorporated by reference. Further analysis shows that if two strain gauges are aligned along these axes, a signal can be obtained that is proportional to only the torque and not to any other forces or moments that may be applied to the stem.

For most applications it is desirable to have the vorticity measurement probe as small as possible in order to minimize its effect on the flowing fluid. Relatively new techniques presently used in the field of microcircuit technology can be applied to deposit or bond the two strain gauges onto the stem member 10. Either a vacuum sputtering or a photolithographic technique, both of which are commonly used in the semiconductor art, can be used. The two strain gauges 24 and 26 must be separated by a thin sheet of electrical insulator, such as quartz, which can also be deposited by sputtering.

Figure 4:
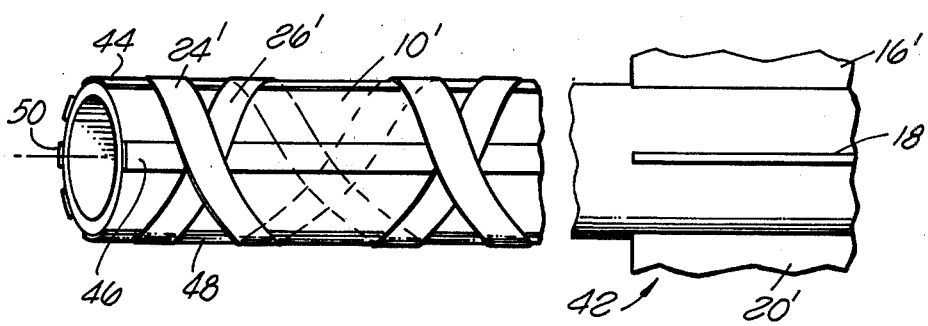
FIG. 4 is an enlarged side view of a second embodiment having six strain gauges; and, FIG. 5 is a second probe configuration showing a ball having a roughened outer surface as the torque imparting means.

Additional strain gauges, if properly located, can also be utilized to measure fluid velocities normal to the longitudinal axis of the stem member 10. A second embodiment of the invention utilizes six strain gauges as explained below. Referring to FIG. 4, a portion of a stem member 10' and a portion of the stem member end having fins 14' (not shown), 16', 18' and 20' attached are shown. The stem member 10' is a hollow tube rather than a solid cylinder as utilized in the FIG. 2 embodiment. The hollow tube maximizes the amount of twist due to applied torque while retaining as much stiffness as possible. Torque measurement strain gauges 24' and 26' on the stem member 10' are located in the same manner as described and shown in FIG. 3. For electrical insulation, an additional sheet of quartz is deposited and four longitudinally extending strain gauges 44, 46, 48 and 50 are located at 90 degree intervals about the stem member circumference and are so positioned so that the axis of each strain gauges is parallel to the longitudinal axis of the stem member 10' and if extended would intersect one of the fin edges. Thus strain gauge 44 is longitudinally aligned with fin 16', strain gauge 46 is longitudinally aligned with fin 18' strain gauge 48 is longitudinally aligned with fin 20', and strain gauge 50 is longitudinally aligned with fin 14' (not shown). The alignment shown in this embodiment is not essential, however, and other alignments can be compensated for by more complex data reduction processes.

The four longitudinally extending strain gauges 44, 46, 48 and 50 measure fluid flow velocity components normal to the longitudinal axis of the stem member 10'. These components result in a bending moment being applied to the stem member 10', and do not result in a twisting moment as imparted by a vorticity component. Thus, it can be appreciated that this second embodiment completely defines flow of a fluid other than its velocity component parallel to the longitudinal axis of the stem member 10'. The spirally-wound strain gauges 24' and 26' provide outputs proportional only to vorticity. A first pair of opposing fins 14' (not shown) and 18' provide a bending moment to the stem 10' which is measured as a tensile and compressive strain by their corresponding strain gauges 44 and 48 which output a signal proportional to identical forces, both in direction and magnitude, applied normal to the fin surfaces. Similarly, a second pair of opposing fins 16' and 20' provide a bending moment to the stem member 10' which is measured as a tensile and compressive strain by their two corresponding strain gauges 46 and 50 which also output a signal proportional to identical forces, both in direction and magnitude, applied normal to the fin surfaces. The longitudinal velocity component parallel to the probe axis 10' would cause a compressive strain in all four gauges 44, 46, 48 and 50 by the action of the frictional forces on fins 14', 16', 18' and 20'. A sum of the output from these gauges would provide a measure of this velocity component as well.

Figure 5:
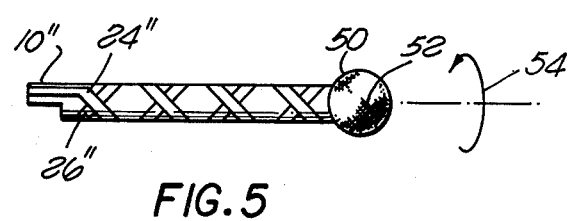

A further embodiment of the torque-imparting means is shown in FIG. 5. It consists of a stem member 10" and the two spirally wound strain gauges 24" and 26" as previously described. Attached to the distal end of the stem member 10" is a sphere 50 having a roughened surface 52 as represented by the hatched lines. The sphere 50 is fixedly attached and symmetrically disposed on the distal end of the stem member 10". It can be appreciated that any vorticity components of a flowing fluid as represented by the arrow 54, will impart a torque to the sphere 50 which in turn will twist the stem member 10" resulting in outputs from the two spirally-wound strain gauges 24" and 26".

I claim:
1. A vorticity measurement probe comprising:
an elongated stem member;
means for fixedly securing one end of said stem member;
means symmetrical around the longitudinal axis of said stem member for imparting a torque to the other end of said stem member proportional to the vorticity of a flowing fluid; and means for measuring said imparted torque comprising two strain gauges spirally-wound on said stem member, both of said strain gauges oriented at 45 degrees with respect to the longitudinal axis of said stem member so as to intersect each other at least at one point, said intersection forming an angle of substantially 90°.

2. The probe of claim 1 in which said torque imparting means comprises two or more fins, at least two of which have non-coplanar side surfaces, said fins being fixedly attached to the other end of said stem member, said side surfaces being substantially parallel to said stem member longitudinal axis.

3. The probe of claim 2 in which said torque imparting means comprises four fins, each being spaced at 90 degree intervals about said stem longitudinal axis.

4. The probe of claim 1 in which said torque measuring means comprises two additional strain gauges whereby to provide four strain gauges in two pairs, each of said four gauges being mounted on said stem member at an angle of 45 degrees with respect to the longitudinal axis of said stem member, the two gauges which comprise each gauge pair being mounted in diametric opposition.

5. The probe of claim 1 in which each of said strain gauges spirals around said stem member at least 360 degrees.

6. A vorticity measurement probe comprising:
an elongated stem member;
means for fixedly securing one end of said stem member;
means for imparting a torque to the other end of said stem member proportional to the vorticity of a flowing fluid;
means for measuring said imparted torque; and
said means for imparting torque comprising a substantially spherically shaped member having a diameter larger than said stem member, said spherically shaped member having a roughened surface and fixedly mounted to the other end of said stem member so that it has an axis coextensive with the longitudinal axis of said stem member.

7. A vorticity measurement probe comprising:
an elongated stem member;
means for fixedly securing one end of said stem member;
means for imparting a torque to the other end of said stem member proportional to the vorticity of a flowing fluid; and
means for measuring said imparted torque comprising two pairs of strain gauges consisting of four strain gauges, each of said gauges being mounted on said stem member at an angle of 45 degrees with respect to the longitudinal axis of said stem member, the two gauges which comprise each gauge pair being mounted in diametric opposition, said torque measuring means further comprising at least one longitudinally extending strain gauge located on said stem member so that its longitudinal axis is parallel to the longitudinal axis of said stem member.

8. The probe of claim 7 comprising four of said longitudinally extending strain gauges, each being placed at 90 degrees about said stem member longitudinal axis.

9. The probe of claim 7 in which said means for fixedly securing said stem member comprises an identation on said stem.

10. A vorticity measurement probe comprising:
an elongated stem member;
means for fixedly securing one end of said stem member;
means for imparting a torque to the other end of said stem member proportional to the vorticity of a flowing fluid; and
means for measuring said imparted torque comprising two strain gauges spirally-wound on said stem member, both of said strain gauges oriented at 45 degrees with respect to the longitudinal axis of said stem member so as to intersect each other at least at one point, said intersection forming an angle of substantially 90 degrees, said torque measuring means further comprising at least one longitudinally extending strain gauge located on said stem member so that its longitudinal axis is parallel to the longitudinal axis of said stem member.

11. The probe of claim 10 comprising four of said longitudinally extending strain gauges, each being placed at 90 degrees about said stem member longitudinal axis.

12. The probe of claim 10 in which said means for fixedly securing said stem member comprises an indentation on said stem.

* * * * *